(12) United States Patent
Jeong et al.

(10) Patent No.: US 7,212,481 B2
(45) Date of Patent: May 1, 2007

(54) SEARCHING METHOD AND DEVICE FOR A RECORDING MEDIUM HAVING OVERLAPPED TIME ADDRESS

(75) Inventors: Hong Jo Jeong, Pyungtaek-si (KR); Cheol Jin, Sungnam-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 607 days.

(21) Appl. No.: 10/435,393

(22) Filed: May 12, 2003

(65) Prior Publication Data

US 2004/0001397 A1     Jan. 1, 2004

(30) Foreign Application Priority Data

Jun. 27, 2002  (KR)  ....................... 10-2002-0036525
Nov. 14, 2002  (KR)  ....................... 10-2002-0070874

(51) Int. Cl.
    G11B 7/00  (2006.01)
(52) U.S. Cl. ................... 369/53.39; 369/53.37; 369/53.16; 369/53.29
(58) Field of Classification Search ............. 369/53.16
    See application file for complete search history.

(56) References Cited

U.S. PATENT DOCUMENTS

| 5,134,500 | A | * | 7/1992 | Tobe | ........................ 386/125 |
| 5,930,209 | A | * | 7/1999 | Spitzenberger et al. | .. 369/30.05 |
| 6,078,559 | A | * | 6/2000 | Takemura et al. | ........ 369/275.3 |
| 6,541,186 | B2 | * | 4/2003 | Sato et al. | ................... 430/321 |
| 6,639,884 | B2 | * | 10/2003 | Kang | ...................... 369/53.18 |
| 6,947,358 | B2 | * | 9/2005 | Kaji | ......................... 369/44.28 |
| 2003/0142604 | A1 | * | 7/2003 | Nakamura | ............... 369/53.22 |

FOREIGN PATENT DOCUMENTS

| JP | 11296966 A | * | 10/1999 |
| JP | 2000-011397 | | 1/2000 |
| JP | 2001-351311 | | 12/2001 |

* cited by examiner

*Primary Examiner*—Brian E. Miller
*Assistant Examiner*—Peter Vincent Agustin
(74) *Attorney, Agent, or Firm*—Birch Stewart Kolasch & Birch, LLP

(57) ABSTRACT

A method and device for searching a recording medium are provided. The recording medium has a management information area of which location information is overlapped with that of a program area. The method for determining an area on a recording medium having an overlapped time range between two areas reads a time address from a current position on the recording medium, obtains additional information from the recording medium or from a recording medium driving unit, if the read time address belongs to the overlapped range, and determines, based on the obtained additional information, to which one the areas the current position belongs. Therefore, it prevents wrong track jumps that are caused from time-overlapped areas on a capacity-expanded recording medium.

27 Claims, 5 Drawing Sheets

SEARCHING METHOD AND DEVICE FOR A RECORDING MEDIUM HAVING OVERLAPPED TIME ADDRESS

The present application claims, under 35 U.S.C. § 119, the priority benefit of Korean Patent Application Nos. 02-36525 and 02-70874 filed on Jun. 27, 2002 and Nov. 14, 2002, respectively, the entire contents of which are herein fully incorporated by reference.

BACKGROUND OF THE INVENTION

1. Field of the Invention

The present invention relates to a method and device for searching a recording medium having a management information area whose location information is overlapped with the location information of a program area of the recording medium.

2. Description of the Related Art

In general, a disk-type recording medium such as, e.g., a CD-RW, has wobble recording tracks on which ATIP (Absolute Time in Pregroove)-framed data are stored during its manufacturing stage or prior to any data is recorded thereon by a user. As known, the ATIP-framed data are pre-encoded on the recording medium in a wobble shape by frequency modulation.

FIG. 1 shows an example of a general ATIP frame. Each ATIP frame carries certain bits of information. As shown in FIG. 1, if the first bits (M1, S1, and F1) of the 'minutes', 'seconds' and 'frames' fields of the ATIP frame is '000', then these fields are considered to contain an ATIP time code. An ATIP time code is location information for the recording medium and is used to indicate a particular location on the recording medium at which data/information is stored.

FIG. 2 is a graph of an ATIP time code for a general writable disk. As shown in FIG. 2, an ATIP time code TC1 corresponding to a program area (data area) of the disk increases linearly from 0 (zero) to a maximum value of 79:59:74 in the outwardly direction of the disk. An ATIP time code TC2 corresponding to a lead-in area (management information area) of the disk decreases linearly from 99:59:74 to some value in the inwardly direction of the disk towards the disk center.

Generally, the management information area (MIA) including the lead-in area of the disk is about 4~5 minutes in time code size where its time code ranges from about 95 to 99 minutes. On the other hand, the program area of the disk ranges from 0 to about 80 minutes in time code size because its recording capacity is about 80 minutes. Due to the gap between 80 minutes and 95 minutes in time code, the ATIP time code of the management information area of a general disk-type recording medium does not overlap with the ATIP time code of the program area (PA) of the recording medium. As a result, time codes have been used to distinguish between the management information area and the program area of the recording medium during data recording operations.

However, the storage capacity of a conventional disk-type recording medium is being expanded in these days due to the advancement of technology. Due to this effort, a recording medium having a recording capacity (program area) of 99 minutes has been introduced. But, such expansion of recording capacity introduces another problem to the recording medium. Due to the expanded capacity of the recording medium, the recording medium now has an overlapping time code range.

FIG. 3 shows a graph of ATIP time codes of a conventional, capacity-expanded writable disk, illustrating an overlapping range of the time codes between the program area and the management information area of the disk.

As shown in FIG. 3, there are an expanded ATIP time code TC1' for the program area, and an ATIP time code TC2 for the management information area of the disk. The end part of the ATIP time code TC1' of the program area of the disk is overlapped with the ATIP time code TC2 of the management information area of the disk, because the recording capacity of the disk has been expanded to 99:59:74 in time code.

The overlapped ATIP time codes cause certain serious problems. For instance, if an ATIP time code falls within the overlapped ATIP time code range, it often becomes difficult and impossible to know whether a current recording position of the disk is in the management information area or in the program area since the time code would equally apply to both the management information area and the program area. As a result, data can be written in the wrong area of the disk.

As an example of this problem, assume that a particular time address among 95~99 minutes in ATIP time code is requested to a disk device to record information in the lead-in area of the disk at the requested time address. But, if an optical pickup slides erroneously to an outer program area having the time code of 95~99 minutes during a track jump, then the information to be written in the lead-in area (management information area) would instead be recorded in the outer program area, which is completely undesired. Further, even if control signals have been applied to the optical pickup to move the pickup to the desired location in the lead-in area of the disk, if a servo fails then the pickup can be erroneously moved to the program area of the disk, which will result in the recording of the information in the wrong area because the requested time code has applicability both in the program area and the management information area of the disk.

In addition to the use of the ATIP time code as location information of the disk, another way to identify a particular location on the disk is to use an absolute time (MM:SS:FF). As known, when data are recorded on a recording medium such as a CD-Rom, an absolute time (MM:SS:FF) is written in a sub-Q channel of every data block. The absolute time is location information used to indicate locations on the recording medium. A distraction between the ATIP time code and the absolute time is that the ATIP time codes are carried inherently on the disk by the wobbling of the physical tracks on the disk, whereas the absolute times are recorded values made during a recording operation.

If a recording medium has an expanded 99-minute data recording capacity such that the absolute time in the program area of the recording medium has been extended up to (99:59:74) in absolute time, then the absolute time of the management information area of the recording medium will overlap with the absolute time of the program area of the recording medium, similar to what is shown in FIG. 3.

Generally, a disk device such as a recording/reproducing device cannot monitor the time codes of ATIP frames during a data reading (reproducing) because of the hardware structural limitations. Instead, the disk device is configured to monitor the absolute time written in the sub-Q channel of reproduced data. As a result, since the absolute times of the program area and the management information area of the disk overlap with each other as discussed above, then the problem of reading data to a wrong location on the disk can occur even if the correct absolute time has been identified.

For example, assuming that a host sent to a disk device a command to read data from an arbitrary position in the management information area of the disk. But, at this time, if an optical pickup slides erroneously to an outer program area (having the absolute time of 95~99 minutes) during a track jump, then the disk device would read data from the undesired program area, instead of the desired management information area, whereby wrong information/data would be read and provided to the host.

SUMMARY OF THE INVENTION

Accordingly, it is an object of the present invention to provide a method and device for accessing an exact position targeted by a given time information in a current operation mode, on a recording medium having a management information area overlapped in time address with a part of a program area of the recording medium.

Another object of the present invention is to provide a device and method for accessing a recording medium that overcome problems and limitations of the related art.

According to an embodiment of the present invention, a searching method for a recording medium having an overlapped time range between two areas on the recording medium, includes: (a) checking a current operation mode if a target position on the recording medium falls within the overlapped time range; and (b) determining, based on the checked current mode, whether the target position is within a program area or a management information area of the recording medium.

According to an embodiment of the present invention, an area determining method for a recording medium having an overlapped time range between two areas on the recording medium, includes: (a) reading a time address from a current position on the recording medium; (b) obtaining additional information from the recording medium or from recording medium driving means if the read time address belongs to the overlapped time range; and (c) determining, based on the obtained additional information, to which one of the areas the current position belongs.

According to an embodiment of the present invention, a searching device for a recording medium having an overlapped time range between two areas on the recording medium, includes: a first unit for checking a current operation mode if a target position on the recording medium falls within the overlapped time range; and a second unit for determining, based on the checked current mode, whether the target position is within a program area or a management information area of the recording medium.

According to an embodiment of the present invention, an area determining device for a recording medium having an overlapped time range between two areas on the recording medium, includes: a first unit for reading a time address from a current position on the recording medium; a second unit for obtaining additional information from the recording medium or from a recording medium driving unit if the read time address belongs to the overlapped time range; and a third unit for determining, based on the obtained additional information, to which one of the areas the current position belongs.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENTS

In order that the present invention may be fully understood, preferred embodiments thereof will now be described with reference to the accompanying drawings.

Figure 1:
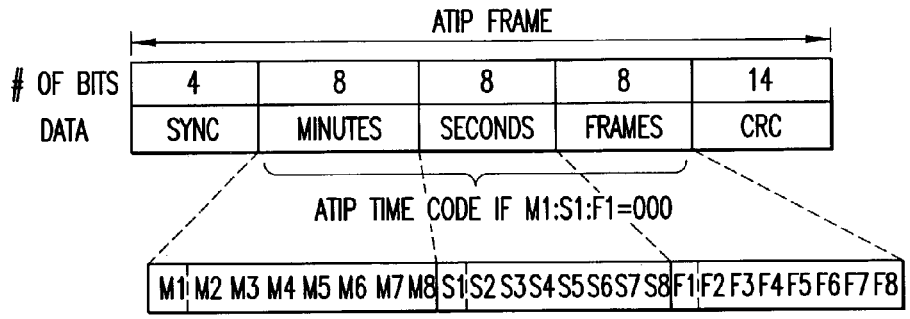
FIG. 1 shows a format of an ATIP time code encoded in a wobble-shaped track of a general writable disk.
Figure 2:
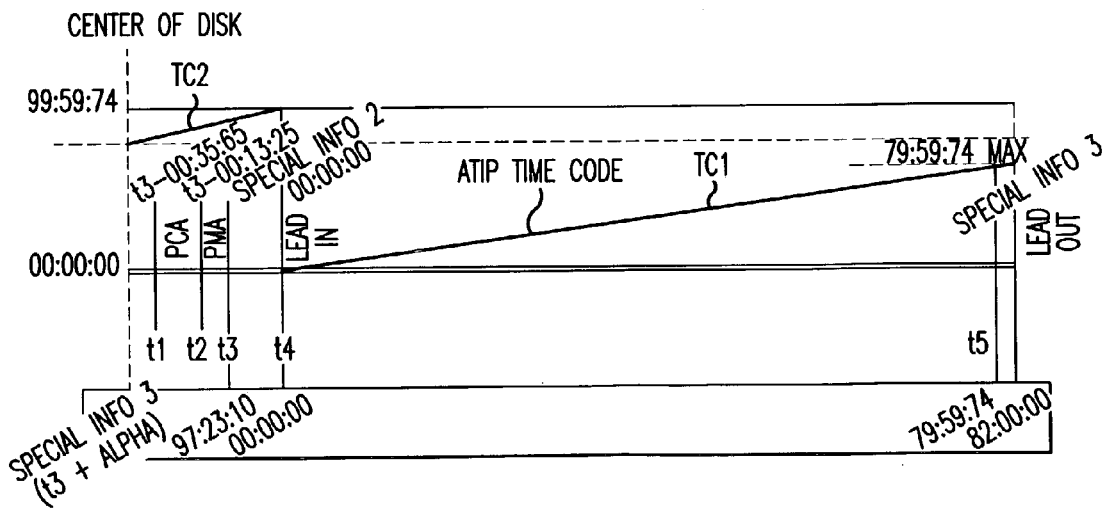
FIG. 2 illustrates a graph of ATIP time codes for a general writable disk.
Figure 3:
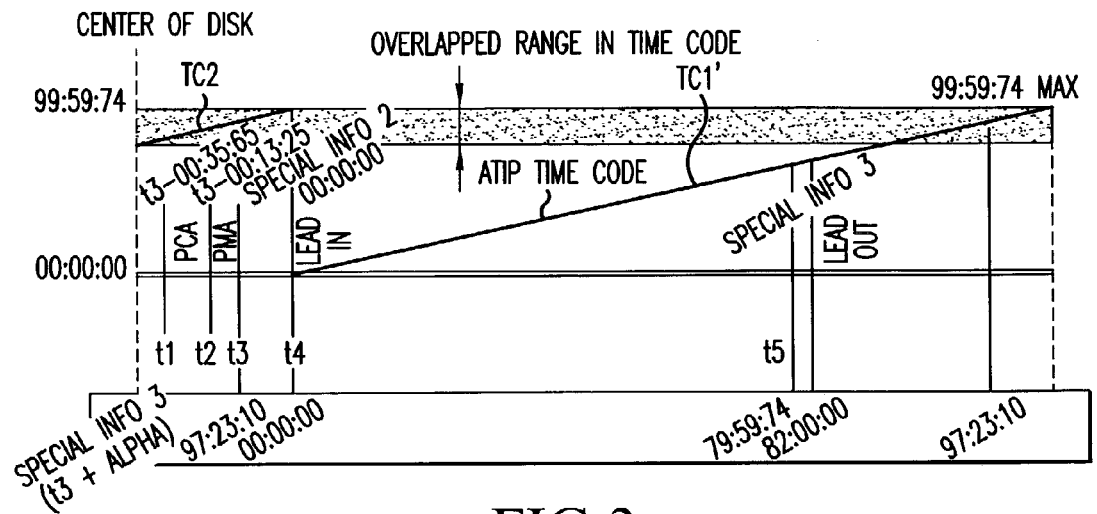
FIG. 3 illustrates a graph of ATIP time codes for a general capacity-expanded writable disk.
Figure 4:
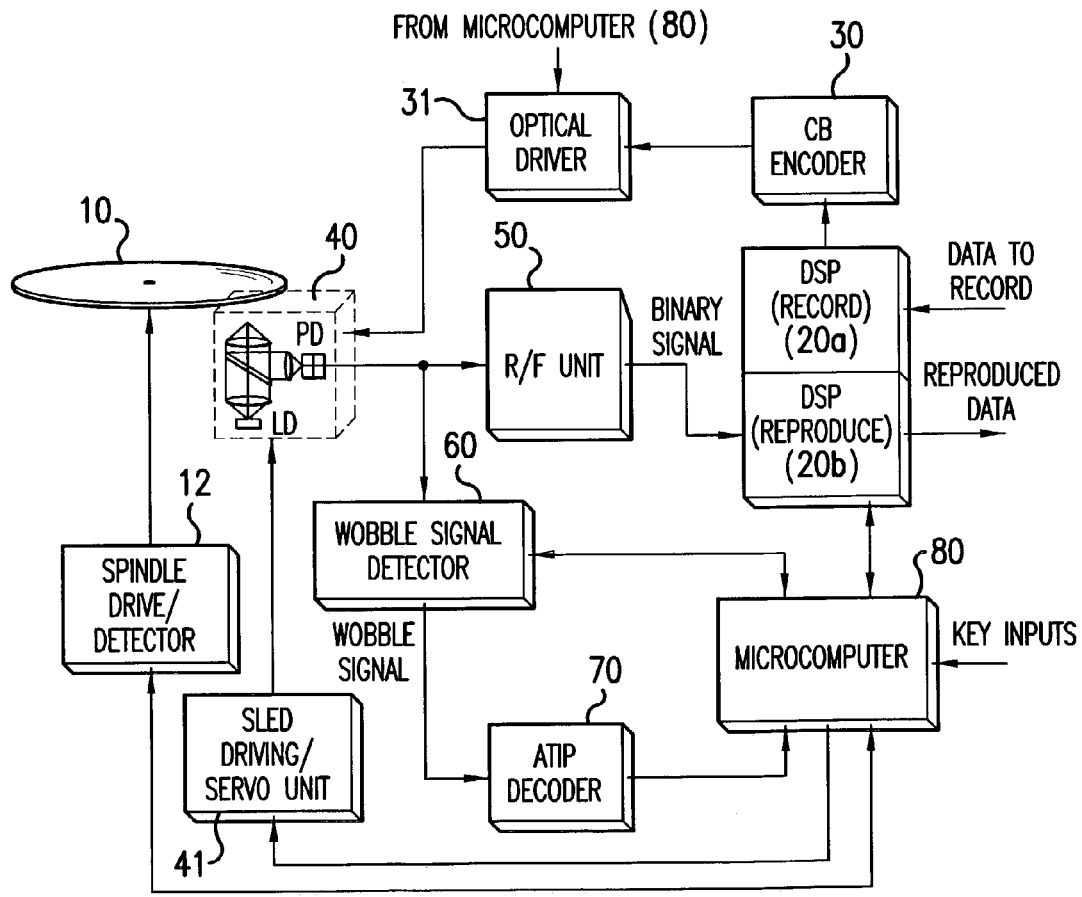
FIG. 4 is a simplified block diagram of a disk drive according to an embodiment of the present invention in which a method to search on an optical recording medium in accordance with the present invention is implementable.

FIG. 4 is a simplified block diagram of a disk drive according to an embodiment of the present invention. A method for searching on an optical disk (e.g., CD type) or other optical recording medium in accordance with the present invention is implementable in the disk drive of FIG. 4 or other suitable device.

As shown in FIG. 4, the disk drive includes a spindle drive/detector 12 for rotating an optical recording medium or optical disk 10 and detecting the rotational speed of the disk 10; a digital recording signal processing unit 20a for converting input data from an external host into record-formatted EFM (Eight to Fifteen Modulation) data while adding thereto additional data such as error correction codes (ECC); a channel bit (CB) encoder 30 for converting the record-formatted data output from the digital recording signal processing unit 20a into writing signals; an optical driver 31 for yielding signals to drive at least one LD (laser diode) or other light source to write or read to/from the disk 10; an optical pickup 40 including the LD and at least one photo detector (PD) for writing signals into mark/space patterns on the surface of the writable disk 10 and/or for reading written signals from the surface of the disk 10; a sled driving/servo unit 41 for moving the pickup 40 horizontally and conducting a tracking/focusing operation of an objective lens in the pickup 40; an R/F (radio frequency) unit 50 for producing binarized signals through filtering and combining the signals detected by the pickup 40; a digital reproduced signal processing unit 20b for restoring original data from the binarized signals output from the R/F unit 50 using a self clock signal synchronized with the binarized signals in phase; a wobble signal detector 60 detecting a wobble signal of low frequency from a reflected signal output from the pickup 40; an ATIP (Absolute Time in Pregroove) decoder 70 for producing ATIP frames by decoding the detected wobble signal; and a microcomputer 80 for controlling all or some of the elements individually for recording, reproducing, searching and other operations. All the components of the disk drive are operatively coupled.

Figure 5:
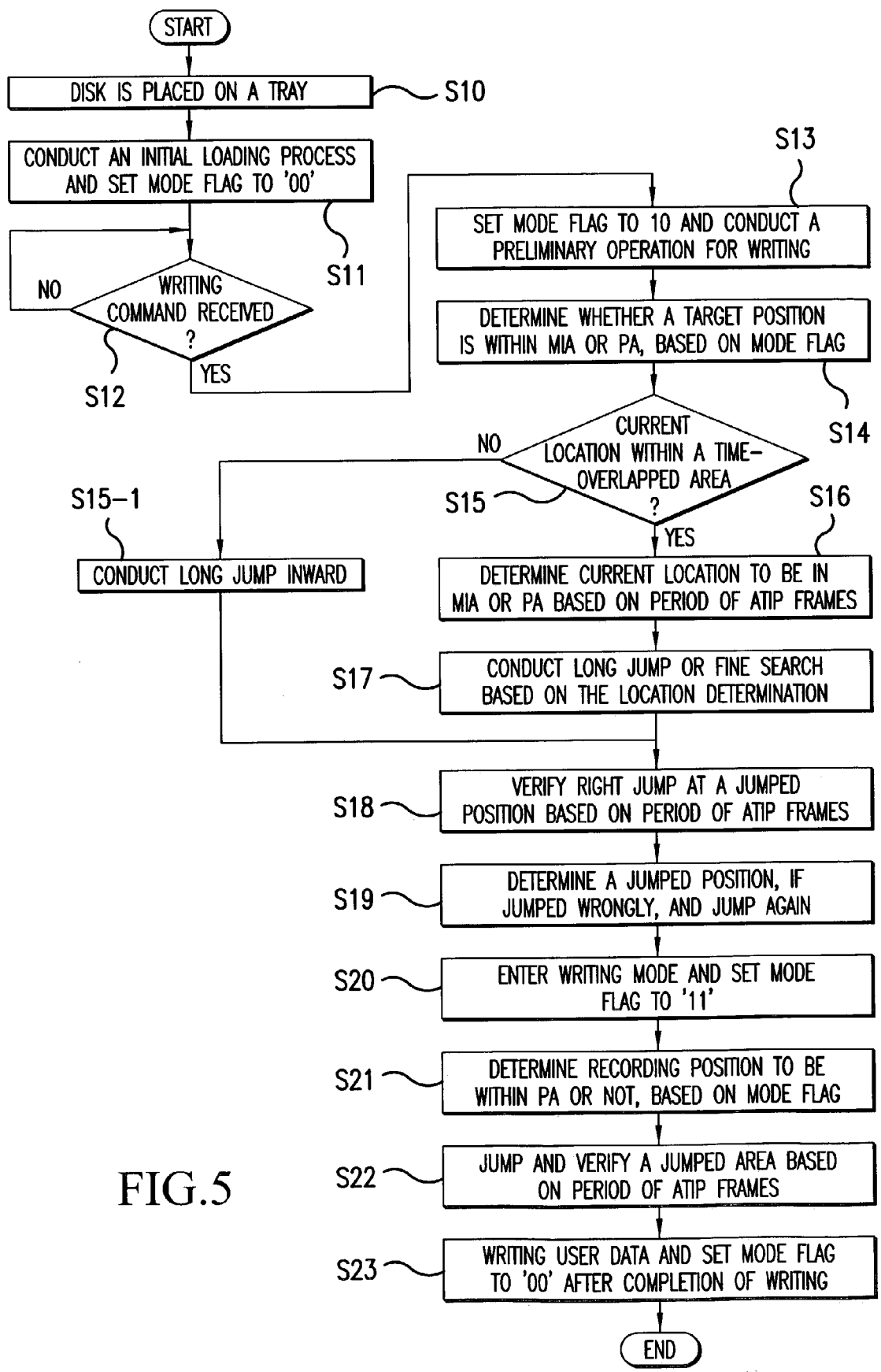
FIG. 5 is a flow chart illustrating the processing steps of a recording medium searching method in a recording mode according to an embodiment of the present invention.

FIG. 5 is a flow diagram of a recording medium searching method in a recording mode according to an embodiment of the present invention. The procedure of FIG. 5 is explained below together with the operation of the disk drive of FIG. 4, and can be implemented by the disk drive of FIG. 4 or other suitable device.

As shown in FIG. 5, when a disk 10 (or other recording medium) is placed on a tray (not shown) equipped in the disk drive (S11), the microcomputer 80 sets an internal 2-bit mode flag to '00' and conducts an initial loading operation for the disk 10 (S11).

The mode flag is represent by "b1b0" where "b1" is the first bit and "b0" is the second bit. The first bit b1 of the mode flag represents 'reading' by being set to 0 or 'writing' by being set to 1. The second bit b0 of the mode flag represents 'initial loading' by being set to 0 or 'reproducing' by being set to 1, if the first bit b1 is set to 0 indicative of 'reading'. On the other hand, the second bit b0 represents 'preparation/completion' by being set to 0 and 'user data recording' by being set to 1, if the first bit b1 is set to 1 indicative of 'writing'.

In the initial loading operation, the disk 10 is rotated by the spindle drive/ detector 12 and the sled driving/servo unit 41 moves the pickup 40 to be positioned close to the recording surface of the disk 10 under control of the microcomputer 80. At this time, the microcomputer 80 determines whether the placed disk 10 is a read-only disk or a writable disk using known techniques, e.g., by using a peak level detected by the R/F unit 50. The microcomputer 80 also adjusts a focusing/tracking offset adequately for the servo mechanism and activates the servo operation of the object lens in the pickup 40.

If the disk 10 is determined to be a 'writable' type, the microcomputer 80 checks whether or not the disk 10 is blank. This can be accomplished by using known techniques, e.g., by checking the presence or absence of an EFM signal from the R/F unit 50 or recorded signals on a PMA (Program Memory Area) of the disk 10.

Now, the microcomputer 80 awaits a command (e.g., a write command, a read command, etc.) from an external host. If a writing command is received (S12), the microcomputer 80 changes the mode flag to '10' to indicate a preparation stage of the writing process, and conducts preliminary operations (S13) to adapt the system for writing and for conducting an OPC (Optimum Power Calibration). To conduct an OPC, the microcomputer 80 decides that a target position of the pickup 40 is a certain time (e.g., 96:14:00) within a PCA (Power Calibration Area). Then the microcomputer 80 checks the second bit b0 of the mode flag to determine whether the target position is in a management information area (MIA) or a program area (PA) of the disk based on the mode flag (S14). Here, because the microcomputer 80 determines that the second bit b0 of the mode flag at this time is '0' indicating 'preparation' in writing, the microcomputer 80 determines that the target position (the determined time) is for the MIA and not for a PA, and moves the pickup 40 (more specifically, the light source) toward the target position.

By the way, it is necessary to detect a current position of the pickup 40 over/under the disk 10 (i.e., the current position on the disk 10) before moving the pickup 40 toward the target position. The microcomputer 80 checks every time code in successively-outputted ATIP frame from the ATIP decoder 70. If the time code at the current position of the pickup 40 does not fall within an overlapped time code range of the disk 10 (S15) which indicates that the current position is not in the MIA, the microcomputer 80 kicks the optical pickup 40 inwardly towards the target position as in a conventional jumping operation (S15-1) so that the pickup 40 is placed in the MIA.

On the other hand, if the detected time code of the current position of the pickup 40 falls within the overlapped time code range of the disk 10 (S15), it is determined whether the current position of the pickup 40 is in the MIA or in the PA of the disk 10. To accomplish this, the microcomputer 80 examines the period of ATIP frames or frame sync signals output from the ATIP decoder 70. If the period is shorter than a predetermined reference '$T_{ATIP\_REF}$', then the current position of the pickup 40 is determined to be within the PA; otherwise, it is determined to be in the MIA (S16). This determination is based on the fact that ATIP frames are detected faster in an outer PA than in the MIA. The outer PA is where its time code overlaps with that of the MIA.

If it is determined at step S16 that the current position of the pickup 40 is within the PA of the disk 10, the microcomputer 80 conducts a long jump operation (S17) on the pickup 40 to move the pickup 40 inwardly into the desired MIA of the disk; otherwise, it conducts a fine search operation (S17) because the current position is already near the target position.

Sometimes, the pickup 40 may slide to a wrong place during a long jump operation because of an unexpected over-voltage. To address this problem, optionally, the microcomputer 80 checks again after the long jump whether or not the new position of the pickup 40 is within the MIA (S18). To accomplish this, as explained above, the period of ATIP frames or ATIP sync signals from the ATIP decoder 70 is examined. If the examined period is shorter than the reference '$T_{ATIP\_REF}$', the microcomputer 80 determines that an appropriate jump has been conducted; otherwise, it performs again the current position detection and the track jumping operation as discussed in steps S16–S18 (S19). Steps S18 and S19 may be repeated until the desired position on the disk has been obtained.

After the appropriate jump and the fine search have been made (i.e., once the current position on the disk is in the desired MIA), the microcomputer 80 conducts a writing test on the PCA, and determines an optimal writing power from the analysis of the written test signals. Then it enters a user data recording/write mode. At this time, the second bit b0 of the mode flag is set to '1' (indicating a 'user data recording' mode), which results in '11' of the mode flag from the '10' state (S20).

To record data onto the PA of the disk, the microcomputer 80 checks temporary track information written in the PMA to know exactly where to record the input user data on the disk. Then the microcomputer 80 determines the time address of this recording start position. If the determined recording start position on the disk 10 has a time code that falls within the overlapped time code range, the microcomputer 80 checks the mode flag. In this example, because the second bit b0 of the mode flag is '1', then the microcomputer 80 regards the determined recording start position to be in the PA of the disk (S21).

Afterwards, the microcomputer 80 controls the sled driving/servo unit 41 to jump the pickup 40 from the current position to the determined recording start position. If an overlapped time code is detected at the new jumped position, it is verified based on the period of ATIP frames or ATIP sync signals that the jumped position is within the PA as explained above at step S16 (S22); otherwise, the verifying operation is not conducted. Instead, with reference to the time code of the new jumped position, a rejumping or fine searching operation is conducted.

Now, once the pickup 40 arrives at the exact targeted recording position, then the input user data are sequentially recorded onto the disk 10 as follows.

The input user data are encoded with parity by the digital recording signal processing unit 20a to form ECC blocks which improves the reliability of the data recording/reproduction. Each ECC block is outputted in EFM-formatted serial bits from the digital recording signal processing unit 20a to the channel bit encoder 30 that modulates the serial bits into NRZ signals. The optical driver 31 outputs PWM (Pulse-Width Modulated) writing signals according to the modulated NRZ signals while adjusting the level and/or width of the PWM writing signals in accordance with a selected write strategy. At this time, the optical driver 31 uses the optimal writing power determined through the above OPC. The outputs of the optical driver 31 are converted by the optical pickup 40 to appropriate light beams that form respective marks and spaces along one or more tracks of the writable disk 10 at the recording position. After the user data are recorded as requested by the external host, the microcomputer 80 resets the mode flag to '00' (S23). Then the process ends.

As discussed, in the present invention, when the microcomputer 80 determines a target position for itself or receives a jump command from the external host, it always refers to the second bit b0 of the mode flag to determine whether the position is for the MIA or PA, if the determined target position falls within the overlapped time code range. If the second bit b0 of the mode flag is '0', the target position for recording is determined to be within the MIA, whereas if the second bit b0 of the mode flag is '1', the target position for recording is determined to be within the PA. The reason for this is as follows. If the second bit b0 of the mode flag is '0', then the management information for the recorded user data must be written in the lead-in area of the MIA after completion of the user data recording. If the second bit b0 of the mode flag is '1', it merely means that a recording position of the user data needs to be changed to another position.

If the target position for recording is within the overlapped time code area, the pickup 40 is jumped to inside of the MIA or the PA determined as above. Then, the jumped position is verified based on the period of ATIP frames or sync signals as explained before.

If the time codes of ATIP frames detected from the jumped position belong to the overlapped time code range even though a target position is not for the overlapped time code area, it is checked based on the period of ATIP frames or sync signals whether the jumped position is in the MIA or in the PA. If the jumped position of the pickup 40 is in the MIA, the microcomputer 80 drives the pickup 40 to move outwardly to the target position. If the jumped position is in the PA, the microcomputer 80 moves the pickup 40 inwardly to the target position.

Figure 6:
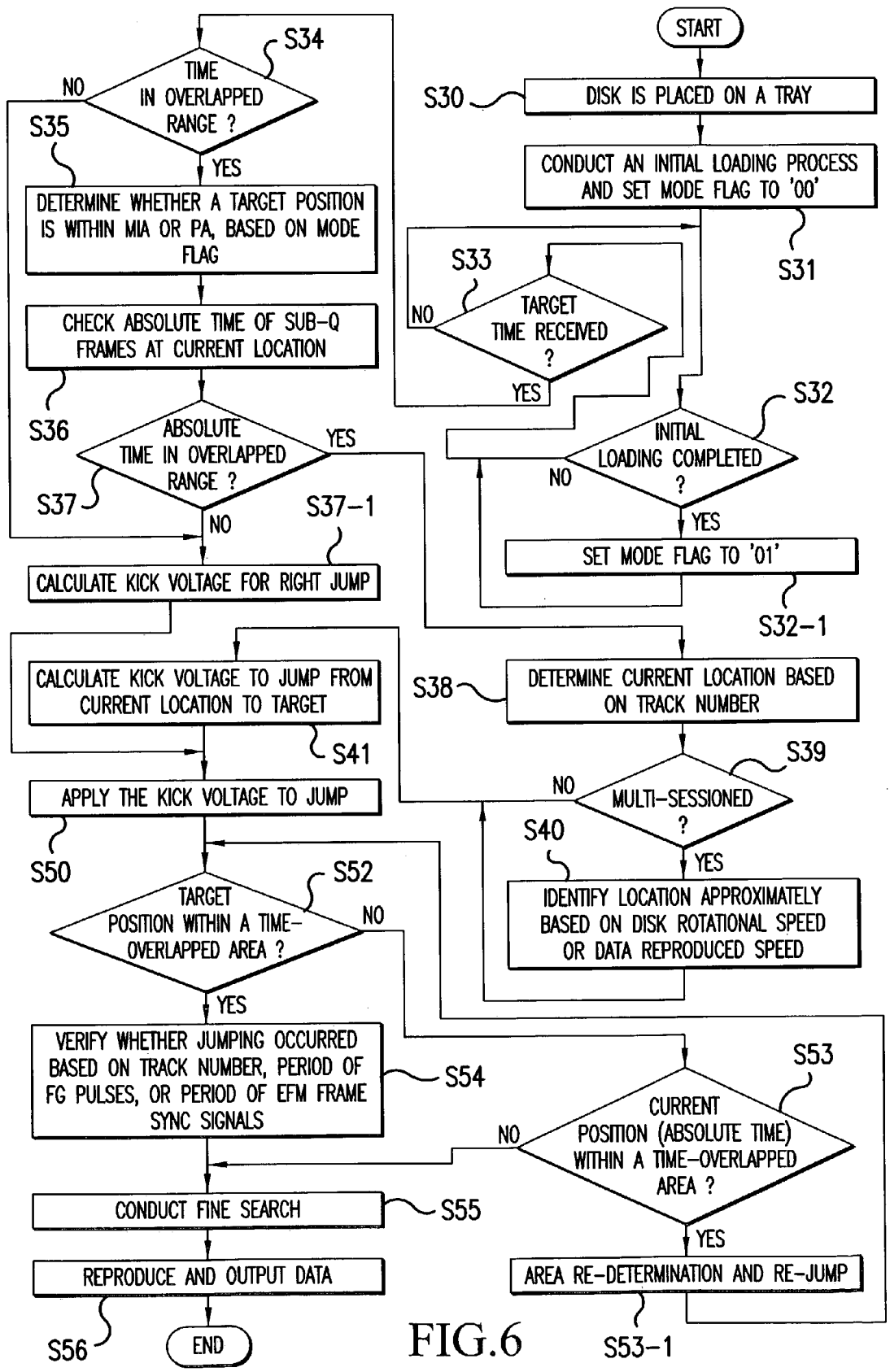
FIG. 6 is a flow chart illustrating the processing steps of a recording medium searching method in a reproducing mode according to an embodiment of the present invention.

FIG. 6 is a flow diagram of a recording medium searching method in a reproducing mode according to an embodiment of the present invention. The procedure of FIG. 6 is explained below together with the operation of the disk drive of FIG. 4, and it is implementable by the disk drive of FIG. 4 or any other suitable device.

When a disk 10 (or other recording medium) is placed on a tray (not shown) equipped in the disk drive (S30), the microcomputer 80 sets the 2-bit mode flag to '00' and conducts the initial loading operation for the disk 10 (S31). At this time, the microcomputer 80 adapts the system to be suitable for reproduction characteristics. For instance, due to this adaptation, the ATIP decoder 70 is not operated during a reproduction mode. After completion of the initial loading operation (S32), the microcomputer 80 sets the mode flag to '01' indicating 'reproducing' (S32-1).

If a target time (target location information) is received from an external host during or after the above S32 and S32-1 operation (S33) and the target time falls within the overlapped time code range of the disk, e.g., 95~99 minutes (S34), then the microcomputer 80 checks the mode flag. At this time, if the mode flag is '00', the microcomputer 80 determines that the target time is for the MIA since the mode flag of '00' indicates that the device is still in the initial loading stage. If the mode flag is '01' indicating that the device is ready for reproducing, the microcomputer 80 determines that the target time is for the PA (S35).

Before moving the pickup 40 toward the target time in the area (e.g., MIA or PA) determined as above, the microcomputer 80 identifies first a current position of the pickup 40 (i.e., the current position of the light source of the pickup 40) with respect to the disk 10. For the current position identification, the microcomputer 80 checks an absolute time written in a sub-Q channel of every data block. The data block is constructed from restored digital data by the digital reproduced signal processing unit 20b.

If the checked absolute time does not belong to the overlapped time code range (S37), the microcomputer 80 calculates a kick voltage suitable to jump the pickup 40 from the current position to the target position by using a known method (S37-1), and applies the calculated kick voltage to the sled driving/servo unit 41 (S50) to jump the pickup 40 to the target position.

On the other hand, if the absolute time at the current position of the pickup 40 belongs to the overlapped time code range (S37), the microcomputer 80 determines the current position of the optical pickup 40 based on the track number (S38). For instance, the microcomputer 80 checks the 'track number' field 'TNO' in the sub-Q frame. If the field 'TNO' is '0', the microcomputer 80 regards that the current position of the optical pickup 40 is within the MIA. But if the field 'TNO' is not '0', the microcomputer 80 regards the current position of the optical pickup 40 to be within the PA.

Then it is determined whether or not the disk 10 is a multi-session disk (S39). If it is determined at step S39 that the disk 10 is not a multi-session disk, then the microcomputer 80 applies a kick voltage calculated based on the determined current position of the pickup 40 and the target position, to the sled driving/servo unit 41 to move the pickup 40 to the position of target time (S50), or conducts a fine search operation.

Figure 7:
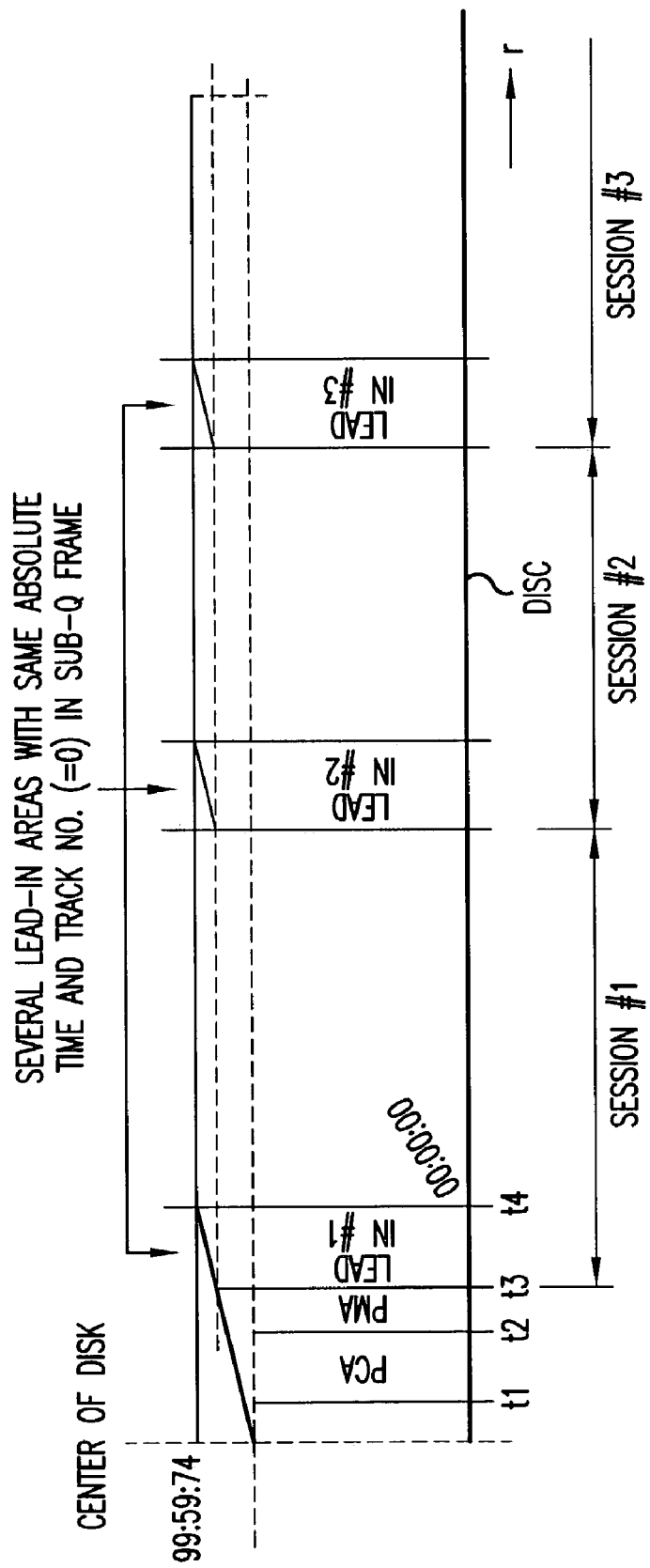
FIG. 7 is a diagram illustrating that several lead-in areas have the same absolute time range in a multi-session disk.

By the way, even though the field 'TNO' in the sub-Q frame is '0', sometimes the current position of the pickup 40 may not be within the innermost lead-in area. This is because the disk 10 may have been written in multi-sessions. In those cases where the disk 10 is a multi-session disk (S39) as shown in FIG. 7, at least one additional lead-in area is created in the PA besides the innermost lead-in area in the MIA. Therefore, it is necessary to know approximately the current position of the pickup 40 (i.e., the current position on the disk) using other means (S40).

For this approximate position identification operation at step S40, the microcomputer 80 first checks whether a current rotational mode is in a Constant Angular Velocity (CAV) mode or a Constant Linear Velocity (CLV) mode. If the spindle drive/detector 12 rotates the disk 10 in the CLV mode, the microcomputer 80 estimates the radius of the current position on the disk 10 approximately based on the period of FG pulses outputted from the spindle drive/detector 12. This is possible because the rotational speed of a disk decreases as a pickup moves outwardly in the CLV mode and the period of FG pulses is inversely proportional to the rotational speed.

If the disk 10 is in the CAV mode, the linear speed of the disk varies because the angular speed is constant. Thus, the microcomputer 80 measures the period of sync codes of EFM data frame constructed from restored digital data by the digital reproduced signal processing unit 20b. Because the linear speed of a disk increases as a pickup moves outwardly in the CAV mode and the period of EFM frame sync codes is inversely proportional to the linear speed of the disk, the current position on the disk 10 can be determined approximately from the measured period.

That is, if the checked field 'TNO' of the sub-Q frame is '0', then the current position on the disk 10 is approximately determined based on the period of FG pulses or sync codes of EFM frames (S40) in case the disk 10 is a multi-session disk. Then the microcomputer 80 applies a kick voltage, which is calculated based on the approximately-determined location (S41), to the sled driving/servo unit 41 to move the pickup 40 to the position of target time (S50), or conducts a fine search operation.

After kicking the pickup 40 to the target position (S50), the microcomputer 80 conducts a location verification. If the target time does not fall within the overlapped time range of the disk (S52) and if the absolute time of sub-Q frames detected from the moved pickup position does not fall within the overlapped time range (S53), then the microcomputer 80 enters a fine search operation from the moved position (S55).

On the other hand, at step S53, if the absolute time detected from the moved pickup position belongs to the overlapped time range, then the moved pickup position is checked again to determine the area (e.g., within the MIA or PA) based on the field 'TNO' of sub-Q frames (in case of a single-session disk) or based on the period of FG pulses or sync codes of EFM frames (in case of a multi-session disk) as in step S40. Afterwards, a suitable kick voltage is calculated again and applied to the pickup 40 to re-move the pickup 40 to the appropriate area on the disk (S53-1).

If the target time belongs to the overlapped time range (S52), for example, if the target position is for the outermost part of PA, then it is checked whether the field 'TNO' of sub-Q frames detected from the moved position (in case of a single-session disk) is not '0' or whether the period of FG pulses or sync codes of EFM frames corresponds to the outermost area (in case of a multi-session disk) in order to verify whether the track jump has been conducted correctly or incorrectly (S54). After the verification has been made, the microcomputer 80 conducts a fine search operation at the moved position of the pickup 40 (S55).

When an exact pickup position matching with the target time is found by the fine search, the R/F unit 50 reproduces data from that position on the disk and the digital reproduced signal processing unit 20b restores the reproduced signals to original digital data and provides them to an external host (S56).

The above-explained searching methods can effectively prevent incorrect and inaccurate track jumps and other problems that are caused due to a time code overlap between a MIA and a PA of a capacity-expanded recording medium.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A searching method for a recording medium having an overlapped time range between two areas on the recording medium, the method comprising:
   (a) checking a current mode of operation to be performed on the recording medium if a target position on the recording medium falls within the overlapped time range; and
   (b) determining, based on the checked current mode, whether the target position is within a program area or a management information area of the recording medium.

2. The method of claim 1, further comprising:
   (c) moving a pickup toward the target position;
   (d) checking management information of a data block from the recording medium at the-a moved position; and
   (e) determining, based on the checked management information, whether or not the movement by said step (c) is conducted correctly.

3. The method of claim 2, wherein said management information is track identifying information.

4. The method of claim 3, wherein said step (e) determines that the movement is conducted incorrectly if the current mode is indicative of an initial loading mode and said track identifying information is not '0'.

5. The method of claim 3, wherein said step (e) determines that the movement is conducted incorrectly if the current mode is indicative of a data reproducing mode and said track identifying information is '0'.

6. The method of claim 1, further comprising:
   (c) moving a pickup toward the target position;
   (d) checking a rotational speed or reproducing speed of the recording medium at the moved position; and
   (e) determining, based on the checked speed, whether the movement by said step (c) is conducted correctly.

7. The method of claim 6, wherein said step (d), in a constant angular velocity (CAV) mode, checks a period of sync signals included in reproduced data.

8. The method of claim 6, wherein said step (d), in a constant linear velocity (CLV) mode, checks a period of pulse signals outputted by rotation of a recording medium rotating motor.

9. The method of claim 1, further comprising:
   (c) moving a pickup toward the target position;
   (d) checking a period of sync signals included in data frames that are decoded out from a wobble-shaped track of the recording medium at the moved position; and
   (e) determining, based on the checked period, whether or not the movement by said step (c) is conducted correctly.

10. The method of claim 1, wherein said step (b) determines that the target position is within the program area if the current mode is a user data recording mode.

11. The method of claim 1, wherein said step (b) determines that the target position is within the management information area if the current mode is an initial mode at a recording or reproducing stage.

12. The method of claim 1, wherein said step (b) determines that the target position is within the program area if the current operation mode is a reproducing mode to reproduce data recorded in the program area.

13. The method of claim 1, wherein said overlapped time range is about from 95 to 99 minutes.

14. The method of claim 1, further comprising:
(c) examining absolute time written in sub-Q channels at a current position on the recording medium; and
(d) determining if the absolute time at the current position falls within the overlapped time range.

15. The method of claim 14, further comprising:
(e) performing a jump operation if said (d) step determines that the absolute time at the current position does not fall within the overlapped time range.

16. The method of claim 14, further comprising:
(e) determining whether the recording medium is a single-session medium or a multi-session medium if said (d) step determines that the absolute time at the current position falls within the overlapped time range.

17. The method of claim 16, further comprising:
(f) estimating a current position on the recording medium based on a rotational speed or reproduced speed of the recording medium if said (e) determines that the recording medium is a multi-session medium; and
(g) performing a jump operation based on the estimation from said (f) step.

18. The method of claim 1, wherein the overlapped time range is an ATIP (Absolute Time in Pre-groove) time code range or an absolute time range.

19. A searching device for a recording medium having an overlapped time range between two areas on the recording medium, the device comprising:
first means for checking a current mode of operation to be performed on the recording medium if a target position on the recording medium falls within the overlapped time range; and
second means for determining, based on the checked current mode, whether the target position is within a program area or a management information area of the recording medium.

20. The device of claim 19, further comprising:
third means for moving a pickup toward the target position;
fourth means for checking management information of a data block from the recording medium at moved position; and
fifth means for determining, based on the checked management information, whether or not the movement by said third means is conducted correctly.

21. The device of claim 20, wherein said management information is track identifying information, and said fifth means determines that the movement is conducted incorrectly if the current mode is indicative of an initial loading mode and said track identifying information is not '0' or if the current mode is indicative of a data reproducing mode and said track identifying information is '0'.

22. The device of claim 19, further comprising:
third means for moving a pickup toward the target position;
fourth means for checking a rotational speed or reproducing speed of the recording medium at the moved position; and
fifth means for determining, based on the checked speed, whether the movement by said third means is conducted correctly.

23. The device of claim 22, wherein said fourth means, in a constant angular velocity (CAV) mode, checks a period of sync signals included in reproduced data; and in a constant linear velocity (CLV) mode, said fourth means checks a period of pulse signals outputted by rotation of a recording medium rotating motor.

24. The device of claim 19, further comprising:
third means for examining absolute time written in sub-Q channels at a current position on the recording medium; and
fourth means for determining if the absolute time at the current position falls within the overlapped time range.

25. The device of claim 24, further comprising:
fifth means for performing a jump operation if said fourth means determines that the absolute time at the current position does not fall within the overlapped time range.

26. The device of claim 24, further comprising:
fifth means for determining whether the recording medium is a single-session medium or a multi-session medium if said fourth means determines that the absolute time at the current position falls within the overlapped time range;
sixth means for estimating a current position on the recording medium based on a rotational speed or reproduced speed of the recording medium if said fifth means determines that the recording medium is a multi-session medium; and
seventh means for performing a jump operation based on the estimation from said sixth means.

27. The device of claim 19, wherein the overlapped time range is an ATIP (Absolute Time in Pre-groove) time code range or an absolute time range.

* * * * *